United States Patent [19]
Drawbaugh

[11] Patent Number: 5,358,570
[45] Date of Patent: Oct. 25, 1994

[54] CROSSHEAD APPARATUS FOR JACKETING WIRE CORE

[76] Inventor: William W. Drawbaugh, 10680 E. Lake Highland Blvd., Dallas, Tex. 75218

[21] Appl. No.: 210,064

[22] Filed: Mar. 16, 1994

Related U.S. Application Data

[63] Continuation of Ser. No. 96,026, Jul. 22, 1993, abandoned.

[51] Int. Cl.5 .............................................. B05L 9/00
[52] U.S. Cl. ................................... 118/404; 118/405; 118/420; 118/DIG. 18; 425/113; 425/114
[58] Field of Search ............... 118/DIG. 18, 420, 404, 118/405; 425/113, 114, 133.1; 264/211.22, 177.2

[56] References Cited

U.S. PATENT DOCUMENTS

| | | | |
|---|---|---|---|
| 3,538,547 | 4/1968 | Drabb | 425/133.1 |
| 3,694,292 | 9/1972 | Schippers | 425/133.1 |
| 3,697,209 | 10/1972 | Schiesser | 425/114 |
| 3,860,686 | 1/1975 | Myers | 425/113 |
| 3,947,173 | 3/1976 | Dougherty | 425/133.1 |
| 4,189,290 | 2/1980 | Bassani | 425/113 |
| 4,279,851 | 7/1981 | Lord | 425/113 |
| 4,472,129 | 9/1984 | Siard | 425/133.1 |
| 4,505,222 | 3/1985 | Holt | 118/DIG. 18 |
| 4,940,504 | 7/1990 | Starnes | 425/113 |
| 5,108,683 | 4/1992 | Anond | 425/133.1 |
| 5,183,669 | 2/1993 | Guillemette | 118/DIG. 18 |

FOREIGN PATENT DOCUMENTS 0255043 2/1988 European Pat. Off. ......... 425/133.1

Primary Examiner—W. Gary Jones
Assistant Examiner—John Hoffmann
Attorney, Agent, or Firm—Daniel Rubin

[57] ABSTRACT

Crosshead apparatus for receiving molten plastic from an extruder to be dispensed as plastic tubing or as a sheathing or jacket about a continuously fed product core such as wire. The crosshead includes a body and manifold within the body having a central passage in which the core to be jacketed is continuously fed. The plastic to be dispensed is constantly heated for temperature stability so as to maintain the flow in a molten state while a predetermined smooth transition flow path forms a substantially annular distribution plane from which the flow concentrically converges about the passing product core at the dispensing site.

11 Claims, 3 Drawing Sheets

CROSSHEAD APPARATUS FOR JACKETING WIRE CORE

This application is a continuation of application Ser. No. 08/096,026, filed Jul. 22, 1993, abandoned.

FIELD OF THE INVENTION

The field of art to which the invention pertains comprises apparatus for dispensing a plastic sheathing or jacketing about a wire core being continuously fed through the apparatus.

BACKGROUND OF THE INVENTION

It is a common industrial practice to encapsulate a wire core such as electrical wires, cables, optical fibers, filaments, etc. with a jacket or sheathing to insulate or isolate them from the ultimate environment in which they are to be placed. With today's technologies, the insulation is usually of a polymer plastic composition that is supplied from an extruder in a molten state and dispensed onto the wire core via a crosshead through which the core is being continuously fed. In the course of advancing to the dispensing site, the molten plastic enters a flow path provided by the crosshead that is intended to afford concentric and uniform distribution about the core prior to it emerging into the ambient atmosphere. Essential in the application of such sheathing is obtaining uniformity of thickness and the absence of voids by preventing irregularities that can readily occur. In some applications, the formed sheathing is water cooled before being coiled or otherwise stored for shipment.

BACKGROUND OF THE PRIOR ART

Various forms of crossheads for sheathing or jacketing continuously fed wire core products are known and widely deployed for a variety of end uses. Characteristically, the prior crossheads have been plagued with inordinate amounts of downtime generally attributed to plastic clogging within the flow channels through the manifold of the crosshead. This is believed caused by an inability to maintain a uniform molten temperature of the plastic in a frequently tortuous flow path formed of small apertures and intricate narrow channels through which the plastic ultimately flows concentrically toward a dispensing site. Even the onset of clogging can result in a defective manufacture resulting in product spoilage before shutdown occurs to clean and/or replace the crosshead. Clogging can also be attributed to uncontrolled atmospheric conditions at the manufacturing site. Typically, a manufacturing plant will be subject to varying sources of air currents having temperature differentials that can adversely affect exposed crossheads by causing temperature fluctuations to occur in the course of production.

Cleaning usually entails a complete disassembly of the crosshead and needless to say represents a costly service not to mention the associated downtime charge resulting from the interruption of production. Despite recognition of the foregoing, a ready solution therefor has not heretofore been known.

OBJECTS OF THE INVENTION

It is therefore an object of the invention to provide novel crosshead apparatus for extruding plastic tubing and characterized by significantly reduced maintenance requirements and production downtime due to clogging as compared to similar purpose devices of the prior art.

It is a further object of the invention to effect the previous object with an improved crosshead construction utilized for applying a plastic sheathing or jacketing to a core product and characterized as having comparatively smooth, open and accessible flow areas so as to render it less susceptible to clogging.

It is a still further object of the invention to effect the previous objects with a crosshead structure able to afford greater consistency of product quality by avoiding voids while maintaining controlled uniformity of a selected thickness of sheathing or jacketing being applied.

SUMMARY OF THE INVENTION

This invention relates to crosshead apparatus for dispensing molten plastic to form tubing or to deposit about a continuously fed core item for forming an uninterrupted sheath or jacket thereabout. More specifically, the invention relates to a crosshead having a novel internally disposed manifold affording a simplified and balanced flow path through which the molten plastic is conveyed to a dispensing site at which a continously fed wire core is being displaced therepast. By virtue of the provided flow path, heat and temperature stability of the plastic is more readily maintained so as to avoid the chronic clogging associated with similar purpose devices of the prior art. As a consequence, cleaning maintenance as well as production downtime is comparatively reduced significantly. At the same time, quality of the end product is significantly enhanced by virtue of the increased ability to exercise quality control over dispensing of the plastic jacket about the wire core.

For achieving the foregoing, the crosshead hereof includes a tapered interfitting body and manifold of predetermined mass affording accurate and repeatable centering without the necessity of adjustment. Control of heat conductivity is optimized to and about the flow channels while the selected mass serves to offset adverse temperature affects from the ambient environment.

Comprising the flow channels are a pair of matching primary semi-annular flow channels in which the molten plastic is received from an external extruder. A pair of tri-directional splitters are situated in the flow path from the primary channels and each in turn diverts the flow to oppositely oriented secondary channels and over a ramped diversion dam. All channel flow leads to a spacing forming a common substantially annular distribution plane from which the merged flow concentrically converges toward the dispensing site.

The primary channels are smooth and radiused while the secondary channels are smooth with flat bottoms and radiused corners so as to gently and without turbulent flow direct the plastic compound toward the 0 degree and 180 degree extremities of the distribution plane. A primary channel lift combined with a gentle ramp up in the bottom of each secondary channel pressures a portion of the plastic compound to progressively and evenly flow over the ramped diversion dam. In this manner, an equal distribution of volume and pressure are achieved at the exit ends of the secondary channels and at the exit edge of the diversion dam to form the substantially annular distribution plane. As a consequence of the foregoing, a balanced distribution of molten plastic results such that the molten plastic can flow easily over the nose of the manifold to over the frusto-conical nose of a wire guider tip before depositing in a gap onto the advancing wire core in a manner achieving a precise and concentric application.

With the foregoing construction, the crosshead hereof enjoys fewer pathways and eliminates the tortious paths, small holes and narrow channels commonly associated with the prior art devices by which plastic clogging can readily occur.

The features and advantages of the invention will be appreciated by those skilled in the art upon reading the detailed description which follows in conjunction with drawings.

DESCRIPTION OF THE PREFERRED EMBODIMENT

Figure 1:
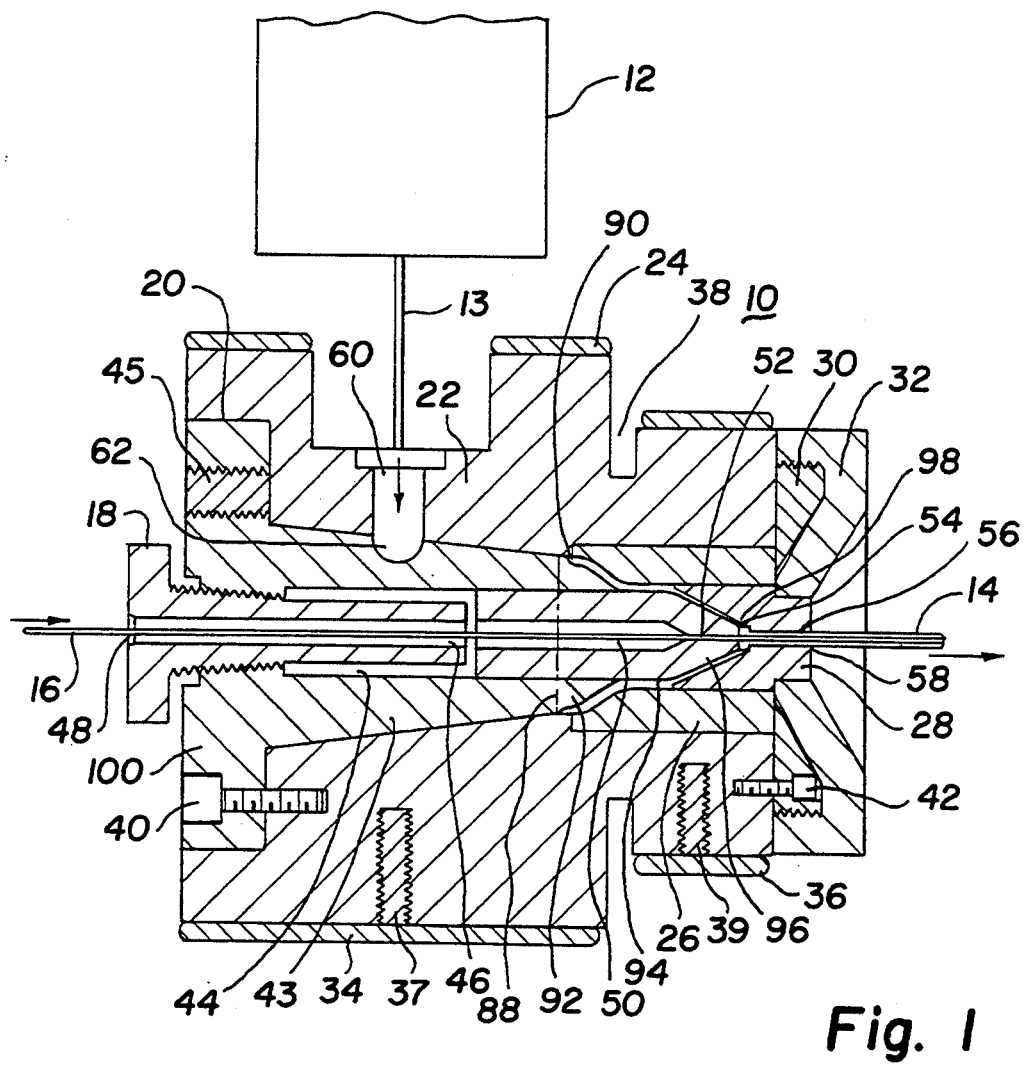
FIG. 1 is a sectional view through an extruder crosshead constructed in accordance with the invention.
Figure 4:
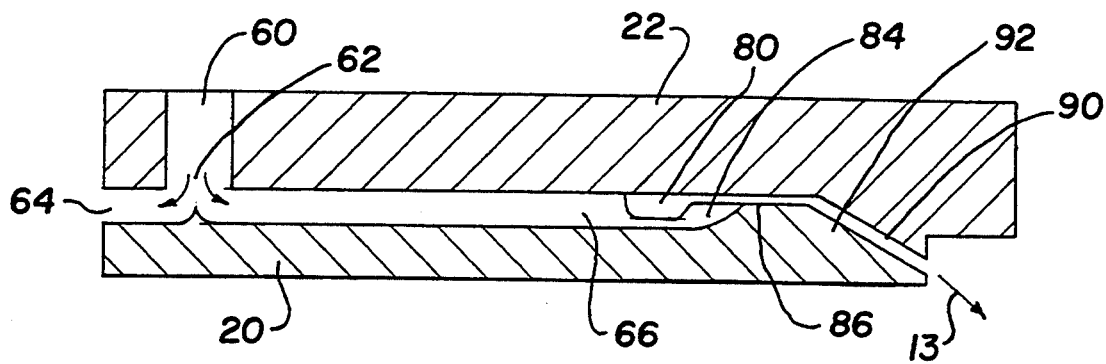
FIGS. 3, 4, 5 and 6 are sectional views as seen substantially from the positions 3—3, 4—4, 5—5 and 6—6 respectively of FIG. 2.
Figure 2:
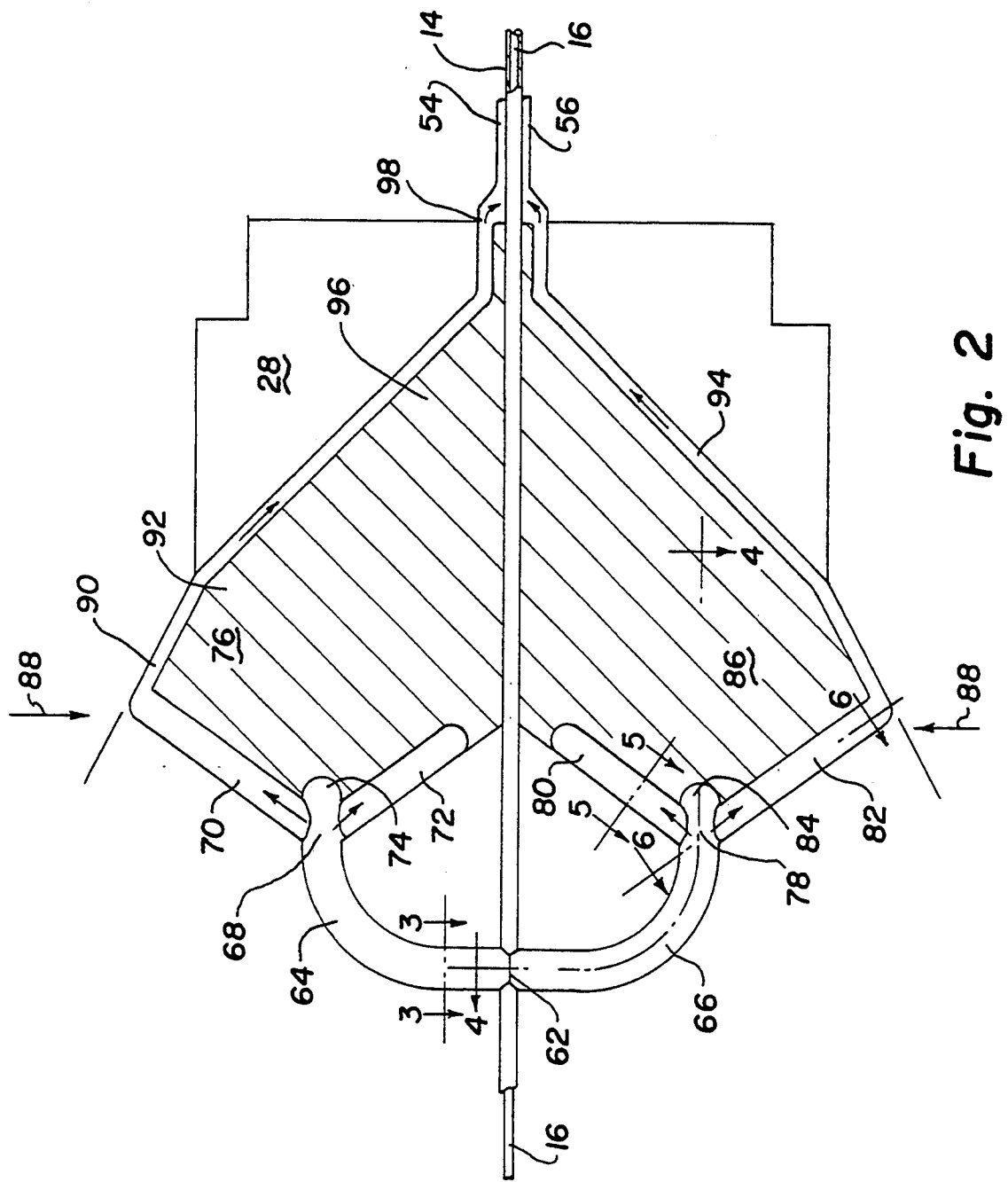
FIG. 2 is a 360 degree unwrap of the manifold flow area in the crosshead of FIG. 1.
Figure 3:
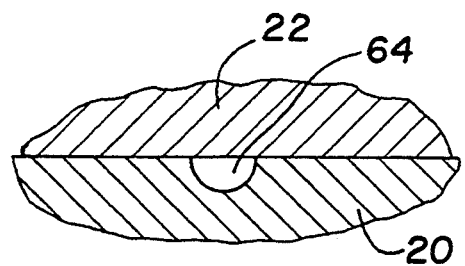
Figure 5:
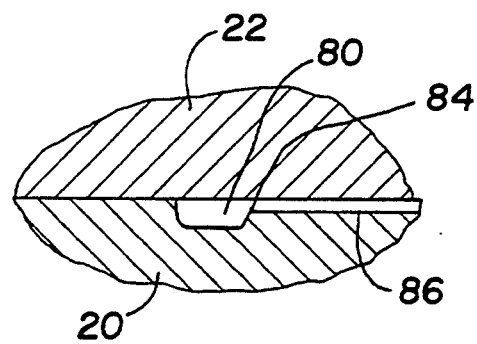
Figure 6:
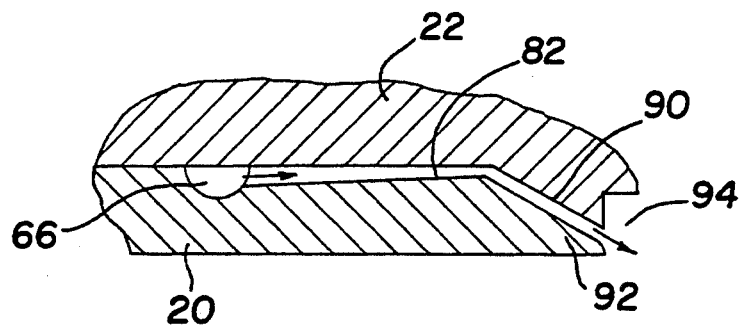

In the description which follows, like parts are marked throughout the specification and drawings with the same reference numerals respectively. The drawing figures are not necessarily to scale and the proportions of certain parts may have been exaggerated for purposes of clarity.

Referring now to the drawings, there is disclosed the crosshead hereof, designated 10, receiving molten plastic 13 from an extruder 12. In a preferred embodiment, the crosshead functions to dispense the plastic in a manner providing an insulating concentric jacket 14 about a wire core 16 being fed continuously into the crosshead from an external source (not shown). The resulting cable formed thereby can be used for various applications such as electrical transmission, optical transmission, telecommunications, etc. Extruder 12 is of a type commercially available for the heating of plastic compounds to a molten or near molten state before extruding the plastic 13 to a utilization apparatus such as the crosshead 10 hereof.

Comprising crosshead 10 is an assembly comprised of a draft shield/tip retainer 18, a tubular manifold 20 secured in a tapered interfit in a tubular head body 22, a forward tip 24 also secured in a tapered interfit within the body, a die sleeve 26, a die 28, a threaded sleeve retainer 30 and a die adjustment nut 32. Wrap-around heater band 34 provides for heat to be conducted, in a first zone, through the body 22, manifold 20 and tip 24 while heater band 36, in a second zone, provides heat to be conducted to the area about die 28. Separate thermocouples 37 and 39 serving the respective zones ensure controlled stability of the heat transmission as will be understood. An annular machined separation 38 aids temperature control in the respective heating zones. A plurality of retaining bolts 40 and 42 secure the head body 22 between the manifold 20 and the sleeve retainer 30. Extraction bolts, when placed in threaded bores 45 aid in removal of the manifold when required. To effect manifold removal, retaining bolts 40 are loosened and extraction bolts in bore 45 are tightened in alternating sequence until complete separation occurs.

Manifold 20 is interfitted in a taper fit within body bore 43 and includes a inner bore 44 in which shield-/retainer tip 18 is threadedly disposed. The shield provides a coaxial tubular bore 46 having an entrance opening 48 into which an extended length of cable wire 16 is to be received continuously fed at a controlled rate typically of on the order of 600 to 6000 feet per minute. Tip 24 is likewise disposed interfitted in bore 44 and affords a central bore 50 in axial communication with bore 46 of shield 18. The downstream forward end of tip 24 is frusto-conically configured and contains a narrowed aperture reduced to a relatively small diameter bore 52. The latter communicates with converging bore 54 of die 28 and a small diameter bore 56 leading to an exit 58 in the die from which the finished jacketed cable emerges.

Molten plastic 13 being extruded from extruder 12 for forming jacket 14 is received in lateral aperture 60 of body 22 communicating with an entry splitter 62 in manifold 20. From the splitter the flow is divided into primary channels 64 and 66 leading to secondary splitter points 68 and 78. The flow from channel 64 at 3-way splitter 68 divides between offset secondary channels 70 and 72 while the center flow encounters the rise 74 ahead of diversion dam 76. Similarly, the flow from primary channel 66 encounters a 3-way splitter at 78 for dividing into secondary channels 80 and 82 while the center flow encounters a rise 84 of diversion dam 86. All flow emerging from the exits of the respective secondary channels along with the flow over the respective diversionary dams are dispersed into a narrow cavity area forming a substantially 360 degree distribution plane along the circumferential line 88. From the distribution plane, flow enters annular passage 90 extending about the nose 92 of manifold 20 and then flows downstream into annular passage 94 about nose 96 of tip 24.

In this manner, all the flow in passage 94 is frusto-conically directed toward a gap 98 intervening axially between the tip nose and the entrance to passage 54. At that location, the molten plastic flowing into space 98 surrounds the advancing wire core 16 so as to form a plastic jacket thereabout before entering converging bore 54. Within the latter bore, the jacket is smoothed about its exterior to a predetermined thickness before emerging through exit 56 with a smooth uninterrupted coating comprising jacket 14. Selected component sizes are utilized to accommodate different cable sections and different jacket thicknesses.

The coating thickness comprising jacket 14 typically ranges from about 3-5 mils. for light cable to about 1/16th inches for heavy cable. Various polymers can be used depending on the type of wire core and the ultimate purpose of the end product. Polymers typically utilized in such crossheads include nylon for which temperatures of about 550 degrees F. are intended to be maintained, fluorocarbons, etc. for which temperatures up to about 900 degrees F. are normally intended to be maintained.

By the foregoing description, there has been disclosed a novel crosshead apparatus for the dispensing of plastic to extrude a plastic tubing. In a preferred embodiment, the plastic forms a sheathing or jacket onto a wire core during the manufacture of cable for a variety of different applications. The high precision tapered fits of the matching components of the crosshead assure accurate repeatable centering rendering adjustment largely unnecessary. The configuration of the flow path about the manifold distributes the plastic compounds with a high order of consistent uniformity while a selected massing of component sizes achieves optimum heat stabilization at various locations in the flow path so as to result in consistent product quality and a high order of operational efficiency. Manifold 20 may include a large rear flange 100 that facilitates heat stabilization by adding mass to the manifold while permitting the manifold to stand erect on an industrial hot plate for pre-heating before assembly or post use for cleaning.

By virtue of the divided flow incurring a substantially annular distribution plane circumferentially about the manifold, the flow becomes concentrically balanced and evenly distributed with regard to both pressure and volume while expeditiously delivering a controlled volume of plastic compound about the advancing wire core at the dispensing site. Being controlled in this manner, the compound is prevented from burning while minimizing back pressure and eddy currents that contribute to clogging the passages in similar purpose devices of the prior art. All flow areas are smoothly radiussed and polished to ensure against obstruction of flow. The two separate heat zones enable separate temperature control in the manifold area and in the die area which facilities the use of dissimilar plastic compounds that may have different flow temperatures. Additional supplemental heat zones may be provided for larger crossheads or heat cartridges may be installed within the manifold to insure a controllable thermal balance throughout the crosshead. The wire guide tip serves also to draw stable heat from the manifold by maximized contact area with the manifold while supporting the incoming cable so as to prevent dragging within the nose tip by which heat distribution could otherwise be rendered erratic.

Since many changes could be made in the above construction and many apparently widely different embodiments of this invention could be made without departing from the scope thereof, it is intended that all matter contained in the drawings and specification shall be interpreted as illustrative and not in a limiting sense.

I claim:

1. Crosshead apparatus for dispensing a tubular section of polymeric plastic composition comprising in combination;
   a) a generally annular body having an inlet at which to receive a continuous flow of at least partially molten polymer plastic composition of which said section is to be formed, said body having an internal bore extending axially therethrough;
   b) a manifold having a bore and disposed coaxially within the internal bore of said body for at least a partial length of said body;
   c) die means disposed coaxially within the internal bore of said body downstream of said manifold and defining a relatively narrow aperture having an inlet and an outlet in flow communication with the bore of said manifold;
   d) means defining a flow path between said body and said manifold for conducting flow of the plastic composition received at said body inlet to near the inlet of said die means and including a pair of matching primary flow channels, each effecting an intersection with a tri-directional splitter for diverting the flow to oppositely oriented secondary channels and over a ramped diversion dam, a substantially annular distribution path defined between said manifold and said body and at least a partially frusto-conical path downstream from said annular path in flow communication between said annular path and the inlet of said die means for said composition to emerge as a tubular section from the outlet of said die means; and
   e) temperature controlled heating means operable to maintain the plastic composition in said flow path means in a molten state until reaching at least the aperture inlet of said die means.

2. Crosshead apparatus in accordance with claim 1 including a tubular member secured in said manifold bore upstream from said die means and having an open inlet in which to receive a length of a product core to be continuously fed through said manifold and said die means and said flow path means is operable to dispense a controlled thickness of the plastic composition circumferentially about the moving core product being fed therepast.

3. Crosshead apparatus in accordance with claim 2 in which said heating means is zoned for separate regulation of temperature within selective axial portions from about said body inlet to about said die means.

4. Crosshead apparatus in accordance with claim 3 in which said flow path means includes a plurality of smooth flow path transitions dividing the flow at locations between said manifold inlet and said annular distribution path.

5. Crosshead apparatus in accordance with claim 2 in which said product core comprises a wire core on which the polymer plastic in said flow path means is dispensed as continuous sheathing or jacketing.

6. Crosshead apparatus in accordance with claim 1 in which said secondary channels extend between the intersection with said primary channel to said distribution path and have a gradually decreasing flow area extending in the downstream direction.

7. Crosshead apparatus in accordance with claim 6 in which said flow path means over said diversion dam defines a narrow flow path affording substantially equal pressure and volume for the plastic flowing therepast.

8. Crosshead apparatus in accordance with claim 7 in which the gradually decreasing flow area of said secondary channels is operative to force a quantity controlled flow of plastic over said diversion dam.

9. Crosshead apparatus in accordance with claim 8 including a tubular tip disposed in said manifold bore in coaxial alignment with said tubular member, said tip having a frusto-conical narrowing in the downstream direction to internally define a narrow coaxial aperture extending through said narrowing in communication with the inlet of said die means and said flow path means extends about said narrowing to toward the inlet of said die means.

10. Crosshead apparatus in accordance with claim 9 in which a flow gap is defined in said flow path means between the downstream end of said tubular tip and the inlet to said die means.

11. Crosshead apparatus in accordance with claim 6 in which said primary channel is of semi-circular cross section.

* * * * *